US012795401B2

(12) United States Patent
Huang et al.

(10) Patent No.: US 12,795,401 B2
(45) Date of Patent: Nov. 10, 2026

(54) DISTRIBUTING MACHINE LEARNING MODEL OPERATIONS ACROSS ENTITIES IN A WIRELESS COMMUNICATIONS NETWORK

(71) Applicant: QUALCOMM Incorporated, San Diego, CA (US)

(72) Inventors: Fei Huang, San Diego, CA (US); Xiaolong Li, San Diego, CA (US); Duo Zhang, San Diego, CA (US); Danlu Zhang, San Diego, CA (US); Qi Xue, San Diego, CA (US); Brian Michael Buesker, San Diego, CA (US); Bibhu Mohanty, Del Mar, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 278 days.

(21) Appl. No.: 18/424,072

(22) Filed: Jan. 26, 2024

(65) Prior Publication Data

US 2025/0247718 A1 Jul. 31, 2025

(51) Int. Cl.
*H04W 48/12* (2009.01)
*H04W 24/02* (2009.01)

(52) U.S. Cl.
CPC ........... *H04W 24/02* (2013.01); *H04W 48/12* (2013.01)

(58) Field of Classification Search
CPC ..... H04W 24/02; H04W 48/12; G06F 9/5027; G06F 9/5066; G06N 3/063; G06N 20/00
See application file for complete search history.

(56) References Cited

U.S. PATENT DOCUMENTS 11,176,495 B1 11/2021 Ron et al.
2021/0142164 A1 5/2021 Liu et al.
(Continued)

FOREIGN PATENT DOCUMENTS

WO 2022252140 12/2022
WO 2023044284 A1 3/2023
WO 2023184312 A1 10/2023

OTHER PUBLICATIONS

Shoki (XP091642173, Shoki Ohta et al: “Lambda-Split: A Privacy-Preserving Split Computing Framework for Cloud-Powered Generative AI”) Oct. 23, 2023, IDS submitted Apr. 7, 2025).*
(Continued)

*Primary Examiner* — Lakeram Jangbahadur
(74) *Attorney, Agent, or Firm* — Patterson + Sheridan, L.L.P.

(57) ABSTRACT

Certain aspects of the present disclosure provide techniques and apparatus for distributing machine learning model operations across entities in a wireless communications network. The method generally includes receiving, at the entity, an input prompt for processing using a machine learning model including a plurality of sub-models including a first sub-model configured to execute on a user equipment and one or more second sub-models configured to execute on network entities in the wireless communications network. Execution of one or more operations for the machine learning model based on the input prompt is coordinated via transmission of control signaling by the entity to one or more of the user equipment or network entities in the wireless communications network. Generally, the operations use a set of sub-models from the plurality of sub-models. A result responsive to the input prompt is generated based on the one or more operations, and the result is output.

20 Claims, 6 Drawing Sheets

(56) References Cited

U.S. PATENT DOCUMENTS

| | | | | |
|---|---|---|---|---|
| 2022/0358375 | A1 | 11/2022 | Finnie et al. | |
| 2023/0196101 | A1 | 6/2023 | Ghanta et al. | |
| 2023/0276338 | A1 | 8/2023 | Gulati et al. | |
| 2024/0365137 | A1* | 10/2024 | Wang | H04W 24/02 |
| 2025/0214606 | A1* | 7/2025 | Zhang | G06N 3/0475 |

OTHER PUBLICATIONS

Leroux (XP036289391, Leroux Sam et al: "The cascading neural network: building the Internet of Smart Things") Feb. 16, 2017, IDS submitted Apr. 7, 2025).*

Gharib (Gharib Anastassia et al: "Distributed Spectrum Sensing for IoT Networks: Architecture, Challenges, and Learning", Apr. 6, 2021).*

Emna ((Emna Baccour et al: "Pervasive AI for IoT Applications: Resource-efficient Distributed Artificial Intelligence") May 4, 2021).*

Baccour E., et al., "Pervasive AI for IoT Applications: Resource-efficient Distributed Artifical Intelligence", arxiv.org, Cornell University Library 201 Olin Library Cornell University Ithaca, NY 14853, May 4, 2021, 58 Pages, XP08158070, p. 14, col. 2, line 32—p. 18, col. 1, line. 21.

Gharib A., et al., "Distributed Spectrum Sensing for IoT Networks: Architecture, Challenges, and Learning", IEEE Internet of Things Magazine, IEEE, vol. 4, No. 2, Apr. 6, 2021, pp. 66-73, XP011867252, abstrat p. 70, col. 1, line 18—col. 2, line 19.

International Search Report and Written Opinion—PCT/US2024/057604—ISA/EPO—Mar. 18, 2025.

Leroux S., et al., "The Cascading Neural Network: Building the Internet of Smart Things," Knowledge and Information Systems, Springer Verlag,london, GB, vol. 52, No. 3, Feb. 16, 2017, pp. 791-814, XP036289391, p. 795, line 1—p. 797, line 20.

Ohta S., et al., "Lambada-Split: A Privacy-Preserving Split Computing Framework for Cloud-Powered Generative AI" arxiv.org, Cornell University Library, 201 Olin Library Cornell University Ithaca, NY 14853, Oct. 23, 2023, 9 Pages, XP091642173, abstract, figures 1, 2 p. 1, col. 2, line 5..p. 5, col. 1, line 6 p. 8, col. 2, line 4—line 6.

* cited by examiner

DISTRIBUTING MACHINE LEARNING MODEL OPERATIONS ACROSS ENTITIES IN A WIRELESS COMMUNICATIONS NETWORK

INTRODUCTION

Aspects of the present disclosure relate to machine learning models, and more specifically to distributed execution of machine learning model operations across entities in a wireless communications network.

Machine learning models may be used for various purposes, for example, generative artificial intelligence models can be used in various environments in order to generate a response to an input query. For example, generative artificial intelligence models can be used in chatbot applications in which large language models are used to generate an answer, or at least a response, to an input query. Other examples in which generative artificial intelligence models can be used include stable diffusion, in which a model generates an image from an input text description of the content of the desired image, and decision transformers, in which future actions are predicted based on sequences of prior actions within a given environment.

Generally, generating a response to a query using generative artificial intelligence models may be computationally expensive. For example, in a chatbot deployment in which a large language model is used to generate a response to a query formatted as a text query, a response to the query may be generated using a pass through the large language model for each token (e.g., word or part of word) generated as part of the response. The output of each pass may be a probability distribution on a set of tokens (word(s) or portions of words) from which the next token may be selected, either by sampling or based on maximum likelihood. Because a pass through a large language model is used to generate each word (or token(s)) in a response to a query, the computational expense may be modeled as the product of the number of words included in the response and the computational resource expense (e.g., in terms of processing power, memory bandwidth, or other compute resources used) of performing a pass through the large language model, which generally increases as the number of parameters within the large language model increases.

BRIEF SUMMARY

Certain aspects of the present disclosure provide a method for distributing machine learning model operations across entities in a wireless communications network. The method generally includes receiving, at the entity, an input prompt for processing using a machine learning model including a plurality of sub-models. Generally, the plurality of sub-models include a first sub-model configured to execute on a user equipment and one or more second sub-models configured to execute on one or more network entities in the wireless communications network. Execution of one or more operations for the machine learning model based on the input prompt is coordinated via transmission of control signaling by the entity to one or more of the user equipment or network entities in the wireless communications network. Generally, the operations use a set of sub-models from the plurality of sub-models. A result responsive to the input prompt is generated based on the one or more operations, and the generated result is output.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict only certain aspects of this disclosure and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
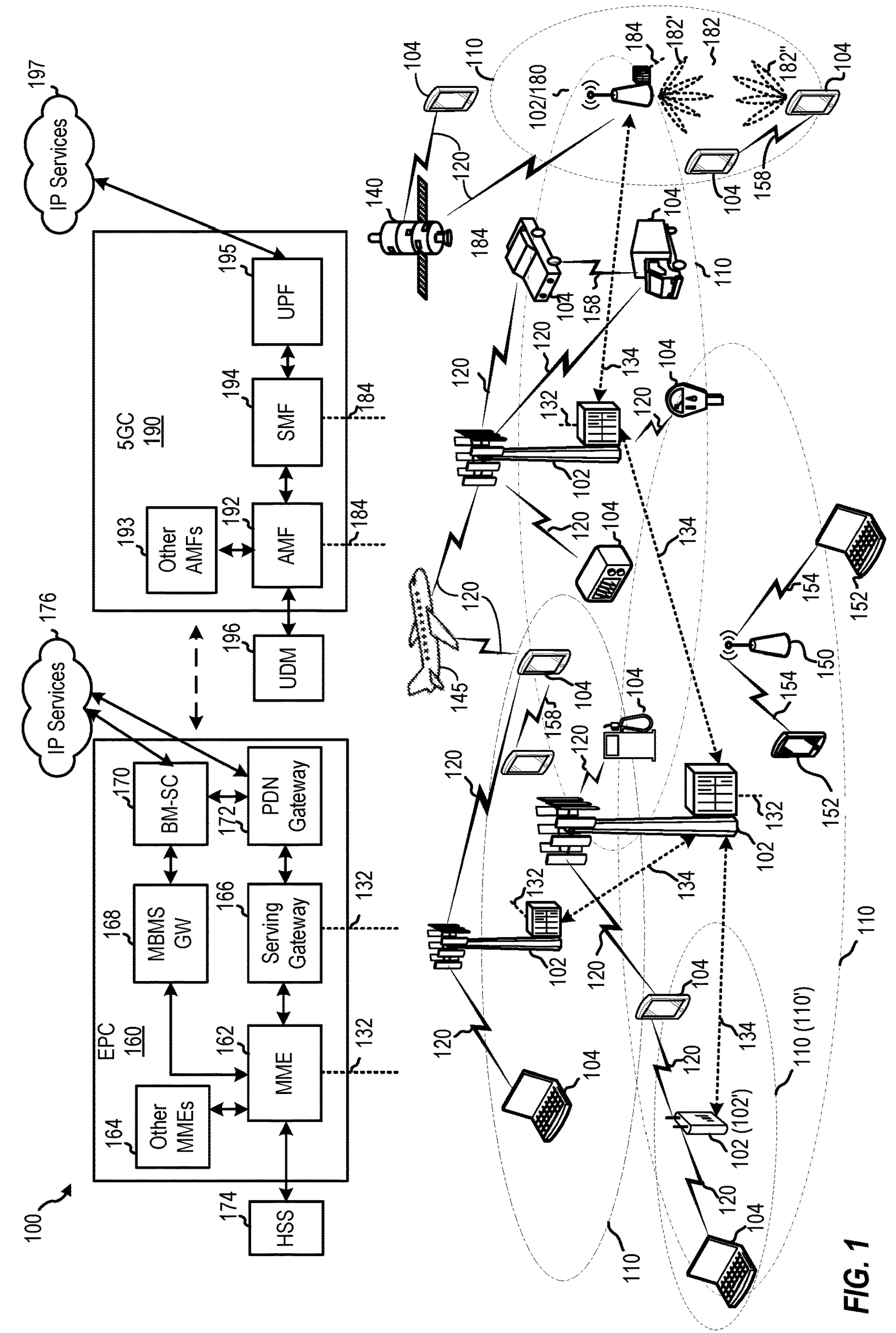
FIG. 1 depicts an example wireless communications network in which aspects of the present disclosure may be implemented.

Aspects of the present disclosure provide apparatus, methods, processing systems, and computer-readable mediums for distributing the execution of machine learning model operations, such as the generation of responses to input queries using generative artificial intelligence models, across entities in a wireless communications network. The term "generative artificial intelligence model" is used interchangeably with the term "generative model" throughout the present disclosure. The term "query" may also be used interchangeably with the term "prompt" throughout the present disclosure. Further, while the foregoing discusses the distribution of generative artificial intelligence model operations across entities in a wireless communications network, it should be understood that the execution of other types of machine learning model operations (e.g., inferencing and training of semantic segmentation models, object detection models, data compression models, etc.) may be contemplated.

Generally, generative artificial intelligence models generate a response to a query input into the model. For example, a large language model deployed within a chatbot can generate a response to a query using multiple passes through the large language model, with each successive pass being based on the query and the tokens (or words) generated using previous passes through the large language model. Generally, these large language models may include a large number (e.g., billions or trillions) of weights or parameters within the model. Because of the size of these models and the operations performed on each token to predict what should be the next token generated in response to a query and the previously generated tokens, it may not be practical, or even possible, to deploy large language models on a variety of devices, such as (but not limited to) those that may have limited memory, storage, and/or processing capabilities relative to a cloud compute instance on which a large language model typically operates. Further, the memory bandwidth involved in generating a response to a query provided as input into a model may prevent compute resources from being used for other tasks.

To allow for generative artificial intelligence models to be used across different devices, differently sized generative artificial intelligence models can be trained and deployed to different devices according to the compute capabilities of these devices. For example, a compact model (e.g., trained with between 7 billion and 20 billion tokens) may be deployed to edge devices (or first set or type of devices), such as laptop computers, tablet computers, smartphones, or the like, while larger models (e.g., models trained with between 20 billion and 70 billion tokens, models trained with between 20 billion and 200 billion tokens, etc.) may be deployed to other devices (or second set or type of devices), such as server computers, a cloud compute instance, or other computing devices with more extensive compute capabilities. By using different-sized models, generative models can be used to generate responses to queries on a variety of devices. However, generally speaking, the size of a model may be related to the ability of the model to generate accurate responses to input queries. For example, more compact models may be able to generate accurate responses to a smaller range of queries than larger models, but as discussed, may be deployed on devices which may not be able to execute operations using these larger models due to a lack of available computing resources.

In some aspects, generative models or other machine learning models for which inferencing and training can have varying computational overheads based on the size of the model may be deployed on various devices within a wireless communications network. These devices in the wireless communications network may have varying computing capabilities. For example, Internet-of-Things (IoT) devices may have more limited computing capabilities than a smartphone, tablet computer, or other personal computing device in the wireless communications network. Meanwhile, devices that provide the infrastructure for communicating in the wireless communications network, such as base stations or access points, may have significantly more computing capabilities than devices which communicate via the wireless communications network. Because of the differences in computing capabilities of devices in the wireless communications network, distributing machine learning model operations across these devices in the wireless communications network may leverage these differences to improve inferencing and training operations (e.g., the amount of time spent executing inferencing and/or training operations for a machine learning model, the amount of memory or processor time used in executing inferencing and/or training operations for a machine learning model, etc.).

Aspects of the present disclosure provide techniques for distributing machine learning model operations (e.g., inferencing using a trained machine learning model, training a machine learning model, refining a machine learning model based on feedback related to prior inferences, etc.) across different devices in a wireless communications network (e.g., user equipments (UEs) and network entities, such as base stations or portions thereof in a distributed network) having different computing capabilities. By distributing machine learning model operations across different devices in a wireless communications network, aspects of the present disclosure may leverage differences in available computing capabilities at the devices within the wireless communications network to accelerate inferencing and training. Further, machine learning models deployed on devices having more extensive computing capabilities can provide feedback or other guidance signals for smaller models deployed on devices having less extensive computing capabilities to improve inference performance for these smaller models.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein (e.g., IEEE 802.11 Wi-Fi networks, IEEE 802.16 WiMAX networks, etc.).

FIG. 1 depicts an example of a wireless communications network 100, in which aspects described herein may be implemented.

Generally, the wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, the wireless communications network 100 includes terrestrial aspects, such as ground-based network entities (e.g., the BSs 102), and non-terrestrial aspects, such as a satellite 140 and an aircraft 145, which may include network entities on board (e.g., one or more BSs) capable of communicating with other network elements (e.g., terrestrial BSs) and user equipments.

In the depicted example, the wireless communications network 100 includes BSs 102, UEs 104, and one or more core networks, such as an evolved packet core (EPC) 160 and a 5G core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, Internet of things (IoT) devices, always on (AON) devices, edge processing devices, or other similar devices. The UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

The BSs 102 wirelessly communicate with (e.g., transmit signals to or receive signals from) the UEs 104 via communications links 120. The communications links 120 between the BSs 102 and the UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

The BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of the BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
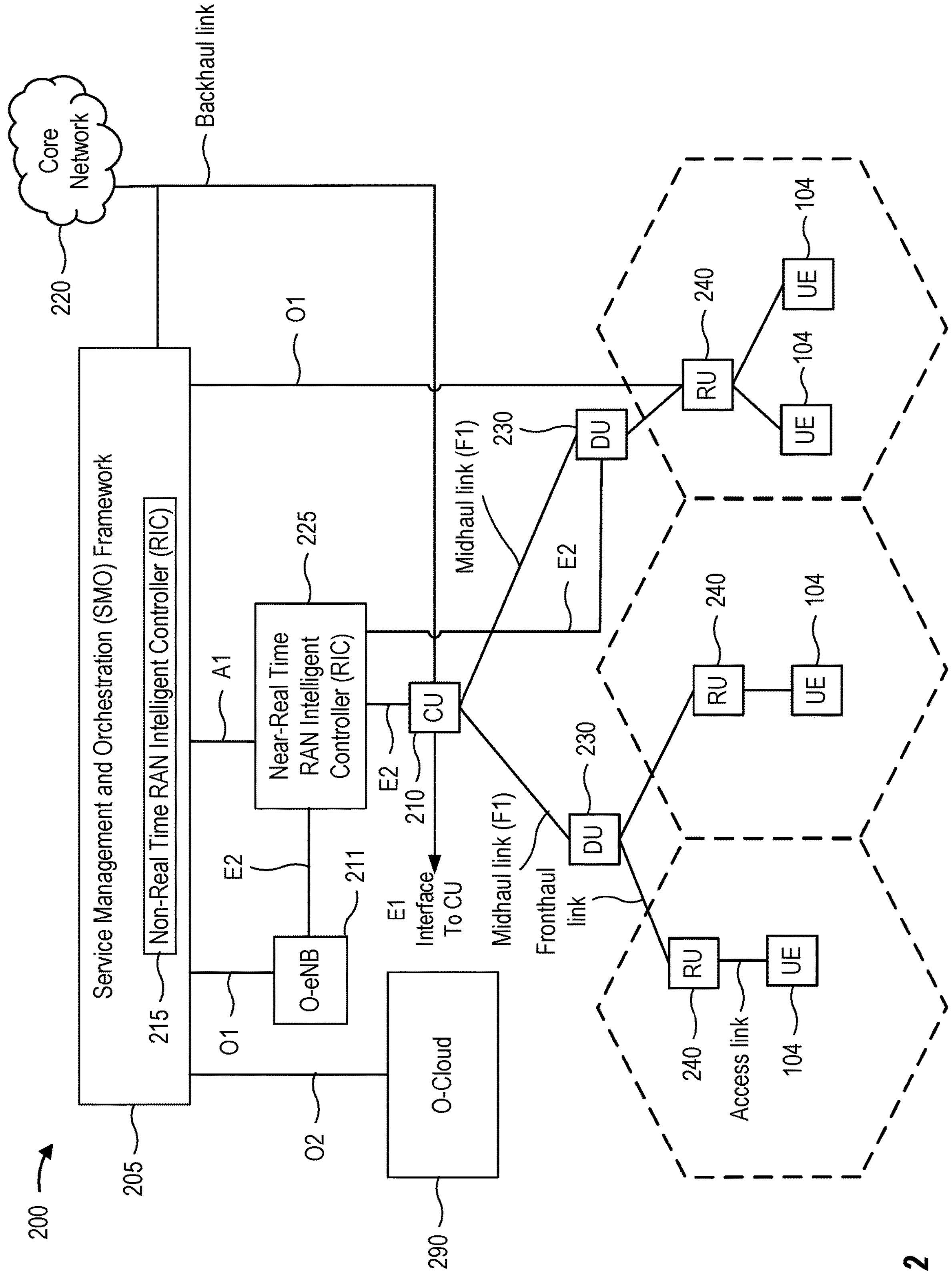
FIG. 2 depicts an example disaggregated base station architecture in which aspects of the present disclosure may be implemented.

While the BSs 102 are depicted in various aspects as unitary communications devices, the BSs 102 may be implemented in various configurations. For example, one or more components of a base station may be disaggregated, including a central unit (CU), one or more distributed units (DUs), one or more radio units (RUs), a near-real-time (near-RT) RAN intelligent controller (RIC), or a non-real-time (non-RT) RIC, to name a few examples. In another example, various aspects of a base station may be virtualized. More generally, a base station (e.g., a BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an open RAN (O-RAN) or virtualized RAN (VRAN) architecture. FIG. 2 depicts and describes an example disaggregated base station architecture.

Different BSs 102 within the wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through the first backhaul links 132 (e.g., an S1 interface). BSs 102 configured for 5G (e.g., 5G NR or Next Generation RAN (NG-RAN)) may interface with the 5GC 190 through the second backhaul links 184. BSs 102 may communicate directly or indirectly (e.g., through the EPC 160 or the 5GC 190) with each other over the third backhaul links 134 (e.g., X2 interface), which may be wired or wireless.

The wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHZ, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mm Wave/near mmWave radio frequency bands (e.g., a mmWave base station such as BS 180) may utilize beamforming (e.g., beamforming 182) with a UE (e.g., UE 104) to improve path loss and range.

The communications links 120 between the BSs 102 and, for example, the UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., BS 180 in FIG. 1) may utilize beamforming 182 with a UE 104 to improve path loss and range. For example, the BS 180 and the UE 104 may each include a plurality of antennas, such as antenna elements, antenna panels, and/or antenna arrays to facilitate the beamforming. In some cases, the BS 180 may transmit a beamformed signal to the UE 104 in one or more transmit directions 182'. The UE 104 may receive the beamformed signal from the BS 180 in one or more receive directions 182". The UE 104 may also transmit a beamformed signal to the BS 180 in one or more transmit directions 182". The BS 180 may also receive the beamformed signal from the UE 104 in one or more receive directions 182'. The BS 180 and the UE 104 may then perform beam training to determine the best receive and transmit directions for each of the BS 180 and the UE 104. Notably, the transmit and receive directions for the BS 180 may or may not be the same. Similarly, the transmit and receive directions for the UE 104 may or may not be the same.

The wireless communications network 100 further includes a Wi-Fi access point (AP) 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. The D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

The EPC 160 may include various functional components, including: a mobility management entity (MME) 162, other MMEs 164, a serving gateway 166, a multimedia broadcast multicast service (MBMS) gateway 168, a broadcast multicast service center (BM-SC) 170, and/or a packet data network (PDN) gateway 172, such as in the depicted example. The MME 162 may be in communication with a home subscriber server (HSS) 174. The MME 162 is the control node that processes the signaling between the UEs 104 and the EPC 160. Generally, the MME 162 provides bearer and connection management.

Generally, user Internet protocol (IP) packets are transferred through a Serving Gateway 166, which itself is connected to a PDN Gateway 172. The PDN Gateway 172 provides UE IP address allocation as well as other functions. The PDN Gateway 172 and the BM-SC 170 are connected to IP Services 176, which may include, for example, the Internet, an intranet, an IP multimedia subsystem (IMS), a packet switched (PS) streaming service, and/or other IP services.

The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and/or may be used to schedule MBMS transmissions. The MBMS gateway 168 may be used to distribute MBMS traffic to the BSs 102 belonging to a multicast broadcast single frequency network (MBSFN) area broadcasting a particular service, and/or may be responsible for session management (start/stop) and for collecting eMBMS related charging information.

The 5GC 190 may include various functional components, including: an access and mobility management function (AMF) 192, other AMFs 193, a session management function (SMF) 194, and a user plane function (UPF) 195. The AMF 192 may be in communication with the unified data management (UDM) 196.

The AMF 192 is a control node that processes signaling between the UEs 104 and the 5GC 190. The AMF 192 provides, for example, quality of service (QOS) flow and session management.

Internet protocol (IP) packets are transferred through the UPF 195, which is connected to the IP Services 197, and which provides UE IP address allocation as well as other functions for the 5GC 190. The IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a near-real-time (near-RT) RAN intelligent controller (RIC) 225 via an E2 link, or a non-real-time (non-RT) RIC 215 associated with a service management and orchestration (SMO) framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the near-RT RICs 225, the non-RT RICs 215 and the SMO framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., central unit-user plane (CU-UP)), control plane functionality (e.g., central unit-control plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, for example, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a VRAN architecture.

The SMO framework 205 may be configured to support RAN deployment and provisioning of non-virtualized and virtualized network elements. For non-virtualized network elements, the SMO framework 205 may be configured to support the deployment of dedicated physical resources for RAN coverage demands which may be managed via an operations and maintenance interface (such as an O1 interface). For virtualized network elements, the SMO framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and near-RT RICs 225. In some implementations, the SMO framework 205 can communicate with a hardware aspect of a 4G RAN, such as an open eNB (O-eNB) 211, via an O1 interface. Additionally, in some implementations, the SMO framework 205 can communicate directly with one or more RUs 240 via an O1 interface. The SMO framework 205 also may include a non-RT RIC 215 configured to support functionality of the SMO framework 205.

The non-RT RIC 215 may be configured to include a logical function that enables non-real-time control and optimization of RAN elements and resources, artificial intelligence/machine learning (AI/ML) workflows including model training and updates, or policy-based guidance of applications/features in the near-RT RIC 225. The non-RT RIC 215 may be coupled to or communicate with (such as via an A1 interface) the near-RT RIC 225. The near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the near-RT RIC 225.

In some implementations, to generate AI/ML models to be deployed in the near-RT RIC 225, the non-RT RIC 215 may receive parameters or external enrichment information from external servers. Such information may be utilized by the near-RT RIC 225 and may be received at the SMO framework 205 or the non-RT RIC 215 from non-network data sources or from network functions. In some examples, the non-RT RIC 215 or the near-RT RIC 225 may be configured to tune RAN behavior or performance. For example, the non-RT RIC 215 may monitor long-term trends and patterns for performance and employ AI/ML models to perform corrective actions through the SMO framework 205 (such as reconfiguration via O1) or via creation of RAN management policies (such as A1 policies).

Within a wireless communications network, such as those illustrated in FIGS. 1 and 2, are devices with varying computing capabilities. For example, a UE 104 may have more limited computing capabilities (e.g., memory, bandwidth, processing units, performance characteristics (e.g., measured in operations per second executable on the processing units), etc.) than an RU 240, which in turn may have more limited computing capabilities than a DU 230, which in turn may have more limited computing capabilities than a CU 210. Because of the differences in the computing capabilities of these devices, execution of machine learning model operations on these different devices in the wireless communications network may not be practical. For example, a CU 210, a DU 230, and/or an RU 240 may have sufficient computing capabilities to execute training and inferencing operations for larger generative artificial intelligence models, while a UE 104 may not have sufficient computing capabilities to execute training and inferencing operations for these larger generative artificial intelligence models (or at least may have insufficient resources to achieve a target level of performance (e.g., speed, accuracy, etc.) for inferencing and/or training operations).

To leverage the differences in computing capabilities across different devices in a wireless communications network, a machine learning model may be structured as a plurality of sub-models with differing sizes. For example, a model may be pruned, truncated, or otherwise reduced in size to generate a first sub-model which may be deployed for execution on a UE 104. A second sub-model, which may be larger (e.g., have a larger number of parameters) than the first sub-model may be deployed for execution on an RU 240. A third sub-model, larger than the second sub-model, may be deployed for execution on a DU 230. Finally, a fourth sub-model, larger than the third sub-model, may be deployed for execution on a CU 210. While the foregoing discusses an example in which a machine learning model is deployed as a set of four sub-models across different devices in a wireless communications network, it should be recognized that a wireless communications network may include any number of entities which can communicate with each other (e.g., via control signaling transmitted on control channels in the wireless communications network), and thus, that the machine learning model may include any number of sub-models of varying sizes for execution on different devices in the wireless communications network.

Speculative Decoding in Generative Artificial Intelligence Models

In some examples, a machine learning model structured as a plurality of sub-models deployed across different devices in a wireless communications network may be a generative artificial intelligence model, such as a large language model or other model that generates a response to an input query (also referred to as an input prompt). In such a case, a draft model may be used to speculatively generate a set of tokens, and a target model, having a larger number of parameters than the draft model, may be used to verify tokens in the set of tokens and select a subset of tokens as a response to the input query.

Generally, autoregressive token generation (e.g., in large language models) may take historical tokens as an input in order to generate an output. That is, autoregressive token generation may be represented by the expression:

$$x_t \sim p(x|x_0, x_1, \ldots, x_{t-1}) \rightarrow x_{t+1} \sim p(x|x_0, x_1, \ldots, x_{t-1}, x_t)$$

where $x_t$ represents a sequence of tokens generated at time t, having a conditional probability p conditioned on the selection of tokens $x_0$ through $x_{t-1}$, and $x_{t+1}$ represents a sequence of tokens generated at time t+1, having a conditional probability p conditioned on the selection of tokens $x_0$ through $x_t$. Generally, a single token may be generated each time an autoregressive model is executed, which means that N inferences may be performed to generate a sequence of N tokens. As discussed above, speculative decoding techniques can be used to accelerate token generation by using a draft model, smaller in size than the target model, that speculatively generates tokens faster than the target model, with the target model being used to verify the tokens (speculatively) generated by the draft model.

In a speculative decoding pipeline, the draft model may speculatively generate n tokens autoregressively, according to the expression:

$$x_{t+1}^{draft} \sim p_t^{draft} = p^{draft}(x|x_0, \ldots x_t), x_{t+2}^{draft} \sim p_{t+1}^{draft}, \ldots, x_{t+n}^{draft} \sim p_{t+n-1}^{draft}$$

where t corresponds to a point in time, $$p_t^{draft}$$

corresponds to the conditional probability distribution associated with a selected token x at time t conditioned on the selection of tokens $x_0$ through $x_{t-1}$, and $$x_t^{draft}$$

represents a token x speculatively generated at time t by the draft model.

The target model takes the generated n tokens and processes the n tokens in parallel to generate probability distributions for each of the n tokens, according to the expression:

$$\left[p_t^{target}, p_{t+1}^{target}, \ldots, p_{t+n}^{target}\right] = \left[p^{target}\left(x \middle| x_0, \ldots x_t, x_{t+1}^{darft}, \ldots, x_{t+k}^{draft}\right)\right]_{k=1,2,\ldots,n}$$

where k corresponds to a token index relative to the generated n tokens and $$p_t^{target}$$

corresponds to a probability distribution generated by the target model at time t for the tokens x generated by the draft model.

The target model can then verify the tokens generated by the draft model by comparing distributions from the draft model and target model to determine whether a token is accepted or rejected. A given token $$x_{t+k}^{draft}$$

may be accepted when $$f\left(p_k^{draft}, p_k^{target}\right) < \alpha,$$

for some function $f$ and some threshold α (also known as an acceptance rate). Otherwise, the token may be rejected. The final token may then be generated at the first rejection position or at the last position n based on some function $$g\left(p_k^{draft}, p_k^{target}\right).$$

Speculative decoding, with an acceptance rate of α, may result in cost reductions relative to using a single autoregressive model to generate tokens iteratively. Inference cost savings, relative to iterative token generation, may be represented by the expression:

$$C^{AR} = NC^{target} \rightarrow C^{SD} = nNC^{draft} + \frac{N}{\alpha + 1} C^{target}$$

where N corresponds to a number of tokens, $C^{AR}$ corresponds to a computational cost using an acceptance rate of α, $C^{target}$ corresponds to a computational cost of generating a set of tokens using the target model, $C^{draft}$ corresponds to a computational cost of generating a set of tokens using the draft model, $C^{SD}$ corresponds to a computational cost of speculatively generating a set of tokens using the draft model, and n corresponds to a number of tokens generated speculatively in a single pass through an autoregressive model. Consider an example in which N=1000, $C^{target}$=10, $C^{draft}$=1, n=4, and α=3. In such an example, speculative decoding may result in a 35% reduction in computational expense relative to autoregressive iterative token generation alone.

Example Distributed Machine Learning Model Operations in Wireless Communications Networks To deploy a machine learning model, such as the large language models or other generative artificial intelligence models discussed above, the machine learning model may be partitioned into a plurality of sub-models for deployment. Each sub-model may, for example, be deployed to a single device (such as a UE or other personal computing device) for execution. However, when the machine learning model is deployed on a single device, the single device may not be able to execute other operations using other machine learning models, and a computational overhead may be incurred in switching between different models or sub-models on the device. Thus, to minimize, or at least significantly reduce, these overheads and allow for flexibility in the execution of operations using different machine learning models, aspects of the present disclosure may distribute the deployment of these different sub-models across different entities in a distributed computing system.

Within a wireless communications network, as discussed, different devices may have different computing capabilities. These differences in computing capabilities may be leveraged to allow for distributed inferencing and training, with results being communicated to other devices in the wireless communications networks via messaging carried on various control channels or other communications links between different devices in the wireless communications network. By doing so, aspects of the present disclosure may allow for the use of computing resources across a wireless communications network to train machine learning models and perform inferencing operations using trained machine learning models while ensuring the reliability of exchanging the results of these operations between different devices in the wireless communications network.

In some aspects, the execution of machine learning model operations (e.g., training a machine learning model or inferencing using a trained machine learning model) may be initiated on any network entity in a wireless communications network. To do so, the network entities (e.g., one or more of the RU 240, DU 230, and/or CU 210) may be configured with a model and the parameters associated therewith. For inferencing operations, the network entities may be configured with a machine learning model or at least a sub-model modified (e.g., pruned, truncated, etc.) to account for the computing capabilities of an accelerator or other dedicated resources on which the model can be executed and parameters (e.g., weights) associated with the model or sub-model. For training operations, the network entities may be configured with a training data set (or at least a portion thereof) and information about a model to be trained using the training data set.

To initiate machine learning model operations in the wireless communications network, a network entity, such as the CU 210, can transmit signaling to other network entities (e.g., another CU 210, the DU 230 and/or RU 240) via one or more entity-to-entity communications interfaces to activate the machine learning models at these other network entities. For example, such activation signaling may be transmitted from the CU 210 to the DU 230 via signaling carried on the F1 interface. In some aspects, to instruct an RU 240 to execute machine learning model operations, the F1 signaling transmitted from the CU 210 to the DU 230 may trigger the transmission of signaling from the DU to the RU via the fronthaul link. Finally, to instruct the UE 104 to perform inferencing operations, in some aspects, the CU 210 can prompt the RU 240 to transmit control signaling to the UE 104 including such instructions. The control signaling may include, for example, downlink control information (DCI) transmitted by the RU 240 to the UE 104, signaling carried in a medium access control (MAC) control element (CE), radio resource control (RRC) signaling, signaling carried on a dedicated control channel (DCCH), or the like. Generally, the transmission of DCI by the RU 240 to the UE may have lower latency than MAC CE signaling, RRC signaling, or DCCH signaling.

Generally, the execution of machine learning model operations may be distributed across a UE and entities in the wireless communications network based on various performance metrics. In examples in which devices in the wireless communications network are memory limited or otherwise do not have sufficient resources to execute machine learning model operations independently, a network entity (e.g., the CU 210) can determine how to distribute the machine learning model operations across the devices in the wireless communications network. The distribution of operations may be, for example, based on an available amount of resources that can be reserved at one or more entities in the wireless communications network for executing machine learning model operations (e.g., where the sub-models deployed on the entities in the wireless communications network are executed as background processes (e.g., services, daemons, etc.) such that computing resources remain available for the entities to perform their primary task(s) of providing connectivity services in the wireless communications network). In some aspects, the network entity (e.g., the CU 210) can distribute machine learning model operations using proportional fair scheduling techniques to minimize, or at least reduce, the likelihood that a particular entity in the wireless communications network is primarily responsible for performing machine learning model operations.

In some aspects, the machine learning model may be structured as a student sub-model deployed on a UE and one or more teacher sub-models deployed on other network entities in the wireless communications network (e.g., on one or more of a CU 210, a DU 230, or an RU 240). Execution of machine learning model operations may occur using the student sub-model and the one or more teacher sub-models sequentially or in parallel. In examples of sequential execution of machine learning model operations, each respective sub-model may be associated with a unique set of layers which are to be executed on a device on which the respective sub-model executes. That is, the deployment and execution of sub-models by the user equipment and entities in the wireless communications network may be structured as a pipeline in which different portions of the machine learning model are executed by different devices in the wireless communications network. Execution may thus begin at a first sub-model (e.g., a model deployed on a UE 104 or other entity in the wireless communications network) and proceed to subsequent sub-models, with the results generated by one sub-model being carried in control signaling (e.g., uplink control information, downlink control information, E1/F1 signaling, etc.) transmitted from a first device in the wireless communications network to a second device in the wireless communications network.

In some aspects, where machine learning model operations can be completed prior to execution of a last layer in the model or while other sub-models are processing an input, a result may be generated by the sub-model executing on a given entity in the wireless communications network and provided to the other sub-models deployed in the wireless communications network via control signaling exchanged within the wireless communications network. For example, in a generative artificial intelligence model distributed across different entities in a wireless communications network, inferencing operations may be completed when an inference (e.g., a token or set of tokens) has an accuracy level meeting or exceeding a threshold expected accuracy level. In another example, in training a machine learning model, operations may be terminated when the model reaches a desired state (e.g., reaches a global minimum, in the case of various gradient descent techniques, etc.). In such a case, termination signaling may be transmitted by the given entity to other entities in the wireless communications network instructing these other entities to terminate operations using the sub-models deployed and executing on these other entities. The termination signaling, like other signaling used to coordinate the execution of machine learning model operations discussed above, may be carried in DCI transmitted to a UE 104, in a DCCH between a network entity (e.g., an RU 240) and the UE 104, or in signaling carried on links between different network entities in the wireless communications network (e.g., on the E1 interface between different CUs 210, the F1 interface between a CU 210 and a DU 230, etc.).

Generally, entities within the wireless communications network can exchange the results of machine learning model operations as such results are generated. The results may include an indication of the type of device which generated the results to allow for results to be aggregated, verified, and/or used to refine other sub-models deployed on other devices in the wireless communications network. For example, an indication that a result was generated by a UE 104 may be used to trigger the execution of various verification processes at one or more of the CU 210, the DU 230, and/or RU 240 to ensure that the result is sufficiently accurate based on the deployment of smaller (though potentially less accurate) sub-models at the UE 104 and larger (and typically more accurate) sub-models at the other entities in the wireless communications network. In another example, an indication that a result was generated by a CU 210 (on which the largest sub-model is deployed) can be used to train (or at least refine) other sub-models deployed in the wireless communications network. More generally, sub-models deployed on network entities (one or more of the CU 210, the DU 230, and/or RU 240) may be used as teacher models, and the sub-model deployed on the UE 104 may be a student model which learns from the results generated by the teacher models deployed in the wireless communications network.

Figure 3A:
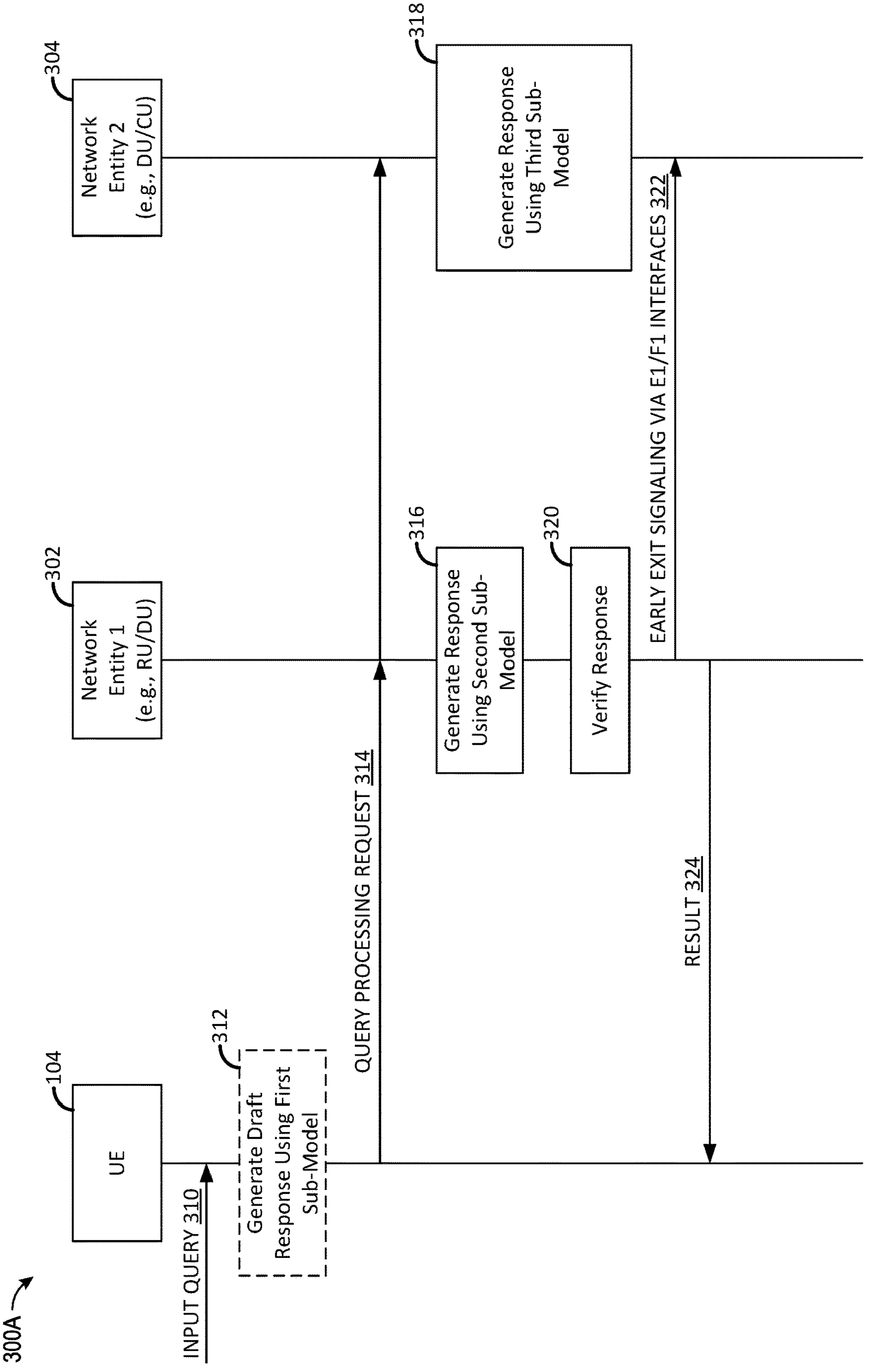
FIGS. 3A and 3B are message flow diagrams illustrating the execution of machine learning model operations across different entities in a wireless communications network, according to aspects of the present disclosure.
Figure 3B:
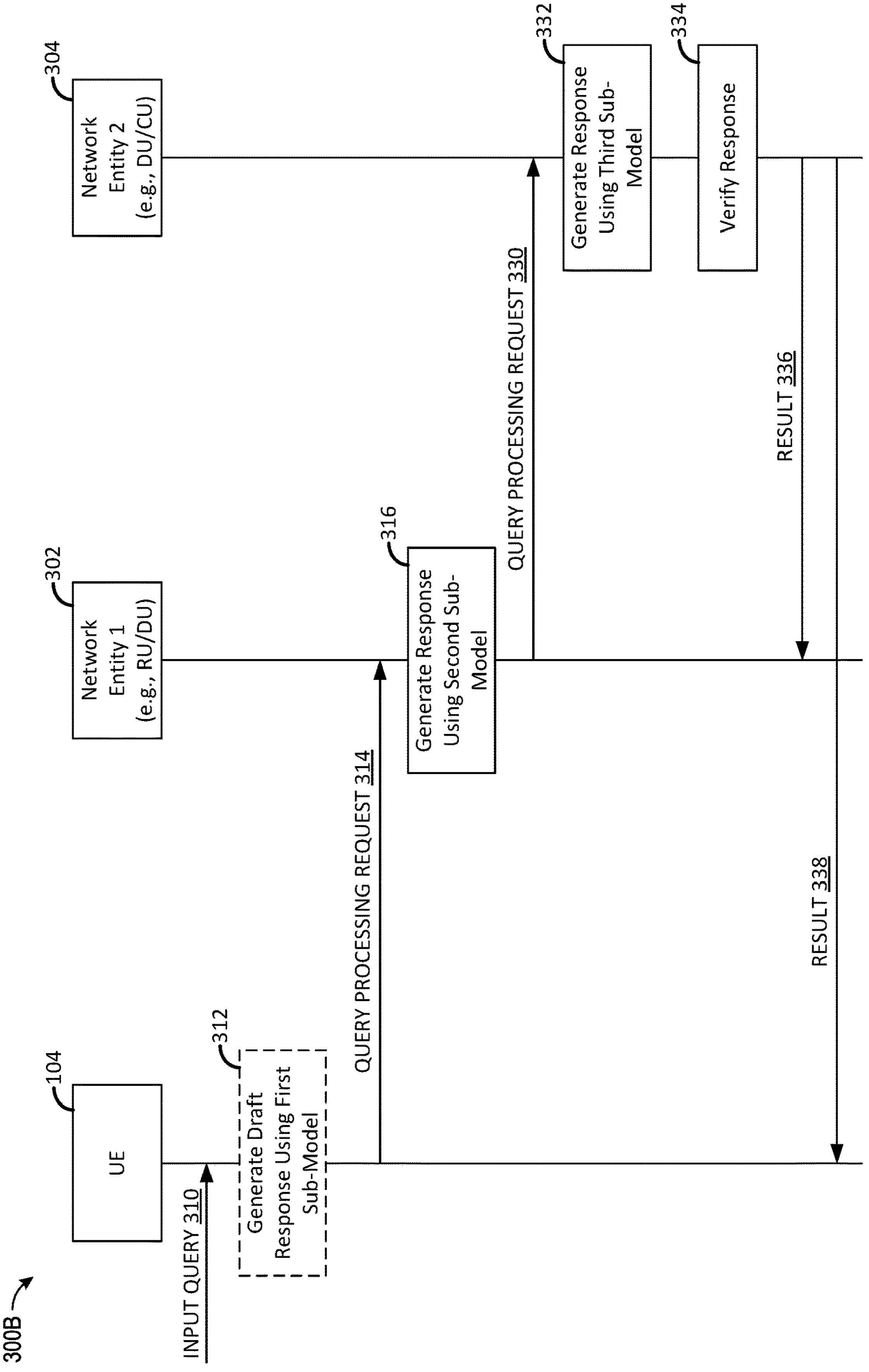

FIGS. 3A and 3B are message flow diagrams 300A and 300B, respectively, illustrating the execution of machine learning model operations across different entities in a wireless communications network, according to aspects of the present disclosure. While the message flow diagrams 300A and 300B illustrate the coordination of machine learning model operations across a UE 104, a first network entity 302, and a second network entity 304, it should be recognized that machine learning model operations may be performed across any number of entities in a wireless communications network.

As illustrated in the message flow diagram 300A, distributed machine learning model operations may begin with the UE 104 receiving an input query 310 for processing. In inferencing examples, the input query 310 may be a prompt that requests the generation of a response using a generative artificial intelligence model (which, as discussed above, may be implemented as a plurality of sub-models distributed across different entities in a wireless communications network). In training examples, the input query 310 may specify a type of model to be trained, the training data based on which the model is to be trained, and various parameters and/or other constraints defining the model and how the model is to be trained.

In some aspects, at block 312, the UE 104 may optionally generate a draft response using a first sub-model to process the input query 310. The result of processing the input query 310 may be, for example, a draft set of tokens generated by a draft model in a speculative decoding pipeline, a set of features for further processing by other sub-models deployed in the wireless communications network, parameters defining a portion of a machine learning model for integration with other portions of a machine learning model being trained by devices in the wireless communications network, or the like.

Response to receiving the input query 310, the UE 104 transmits a query processing request 314 to one or more entities (e.g., the first network entity 302, the second network entity 304, and/or other network entities not illustrated in FIG. 3A) in the wireless communications network. Generally, the query processing request 314 includes the input query 310 and requests that one or more network entities or other devices in the wireless communications network generate a response to the input query 310. In some aspects, where the UE has generated a draft response at block 312, the query processing request 314 may further include the draft response for processing.

In some aspects (though not illustrated), a CU may receive the query processing request 314 and coordinate the execution of machine learning model operations by generating an execution plan for processing the input query 310 across devices in the wireless communications network. The execution plan may, for example, identify devices in the wireless communications network that are to participate in executing machine learning model operations responsive to the input query 310 based on an amount of available computing resources at the devices in the wireless communications network, the task to be performed, and other appropriate metrics, and a scheduling mechanism (e.g., a proportional fair scheduling mechanism) which attempts to fairly distribute a workload across devices in the wireless communications network. Based on the execution plan, the CU can transmit control signaling (e.g., downlink signaling to a UE, signaling on fronthaul, midhaul (E1), and/or backhaul (F1) interfaces, etc.) to other UEs and/or network entities (e.g., RUs and DUs) informing these other network entities of the roles to be performed in executing a machine learning model operation responsive to the input query 310.

In the message flow diagram 300A, the first network entity 302 and the second network entity 304 may be configured to generate a response to the input query 310 in parallel at blocks 316 and 318, respectively. In this example, the first network entity may generate a response to the input query 310 using the second sub-model before the second network entity completes the execution of machine learning model operations using the third sub-model. Thus, while operations using the third sub-model are being executed at the second network entity, the first network entity verifies, at block 320, the response generated by the second sub-model. If the response generated by the second sub-model meets or exceeds a threshold accuracy metric (or other metric which can be used to determine when a response is of a sufficient quality), the first network entity can determine that operations by the other network entities may be terminated. Thus, the first network entity can transmit early exit signaling 322 to the second network entity via control signaling transmitted on interfaces between the first network entity and the second network entity (e.g., via signaling transmitted on the E1 and/or F1 interfaces).

Finally, the first network entity 302 transmits the result 324 to the UE 104. The UE 104 can output the result as a response to the input query 310. In some aspects, the UE 104 can use the result generated by the first network entity 302 as a result generated by a teacher model and train (or re-train) the first sub-model based, for example, on a difference between the draft response generated at block 312 and the response returned by the first network entity in the result 324.

The message flow diagram 300B illustrates an example in which the first network entity 302 and the second network entity 304 operate sequentially to generate a response to an input query 310 received at the UE 104 and distributed for processing amongst devices in a wireless communications network.

Similar to the message flow diagram 300A, an input query 310 is received at the UE 104, and optionally, a draft response to the input query 310 is generated at block 312. Responsive to at least receipt of the input query 310, the UE generates a query processing request 314 and transmits the query processing request 314 to one or more network entities for processing and the coordination of machine learning model operations across different devices in a wireless communications network.

In the example depicted by the message flow diagram 300B, the first network entity may receive the query processing request 314 and, in response, generate a response using the second sub-model at block 316. The response generated at block 316 may be forwarded to the second network entity 304 with the input query 310 in a query processing request 330. In response to receiving the query processing request 330, the second network entity can generate a response using the third sub-model based, at least in part, on the input query 310 and the response generated by the first network entity at block 316. The second network entity may then verify the response at block 334, and based on a determination that the response meets or exceeds an accuracy threshold, transmit the response to the first network entity 302 and the UE 104 via result messages 336 and 338, respectively. In some aspects, the result message 336 may be communicated between the first network entity 302 and the second network entity 304 via, for example, an E1 or F1 interface connecting the network entities. The result message 338 may be communicated to the UE 104, for example, via DCI signaling, signaling carried on a DCCH between a network entity and the UE, or other control signaling, the transmission of which may be performed by an RU in response to messaging received (directly or indirectly) from the second network entity. The first network entity 302 and the UE 104 can, in some aspects use the result generated by the second network entity 304 as a result generated by a teacher model and train (or re-train) the first sub-model and the second sub-model based at least on the response returned by the second network entity in the result messages 336 and 338.

Figure 4:
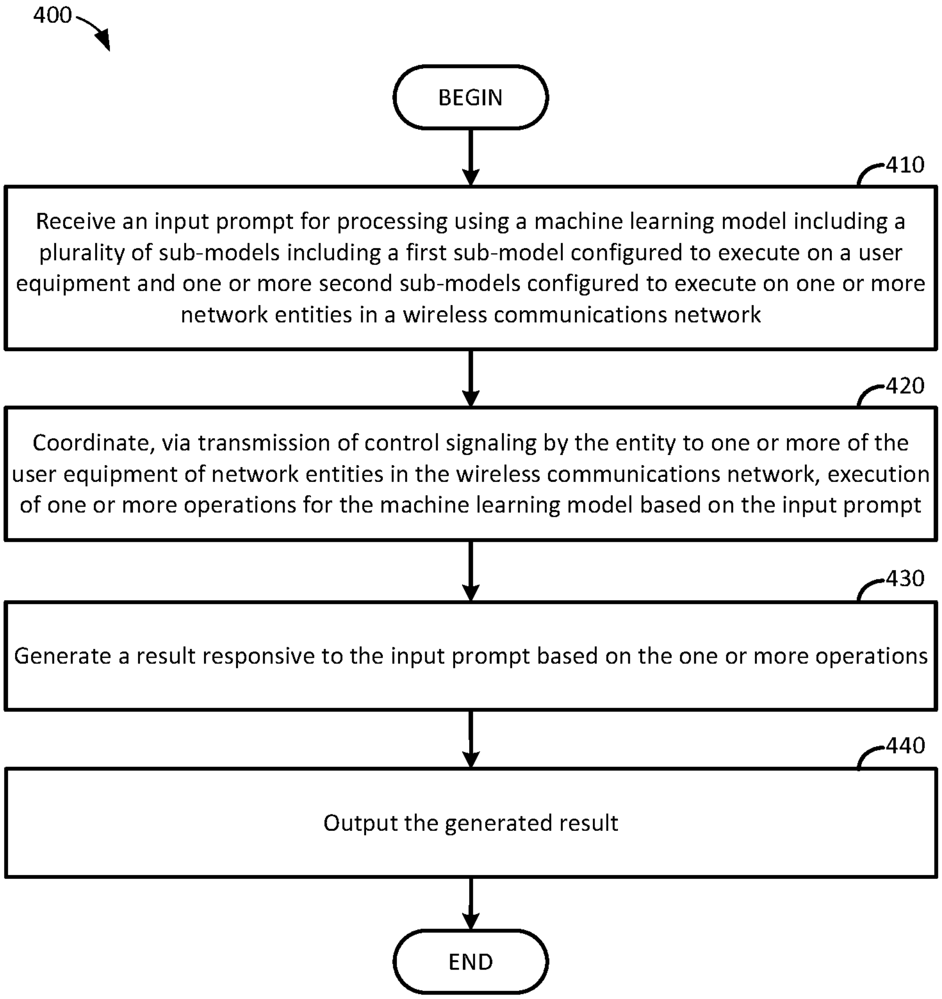
FIG. 4 illustrates example operations for coordinating the execution of machine learning model operations across different entities in a wireless communications network, according to aspects of the present disclosure.

FIG. 4 illustrates example operations 400 for coordinating the execution of machine learning model operations across different entities in a wireless communications network, according to aspects of the present disclosure. In some aspects, the operations 400 may be performed, for example, by an entity in a wireless communications network, such as the CU 210, DU 230, and/or RU 240 illustrated in FIG. 2, or the first and/or second network entities 302, 304 illustrated in FIGS. 3A and 3B.

As illustrated, the operations 400 begin at block 410, with receiving, at the entity, an input prompt for processing using a machine learning model. Generally, the machine learning model includes a plurality of sub-models. The plurality of sub-models may include a first sub-model configured to execute on a user equipment and one or more second sub-models configured to execute on one or more network entities, including the entity, in the wireless communications network.

At block 420, the operations 400 proceed with coordinating, via transmission of control signaling by the entity to one or more of the user equipment or network entities in the wireless communications network, execution of one or more operations for the machine learning model based on the input prompt using a set of sub-models from the plurality of sub-models.

In some aspects, coordinating the execution of the one or more operations includes generating an inference based on one of the second sub-models, the one of the second sub-models comprising a model executing on the entity. The generated inference may be determined to meet a threshold expected accuracy level. Based on this determination, the entity can transmit, to the one or more network entities, one or more control signals instructing sub-models configured to execute on the one or more network entities to terminate operations for the received input prompt.

In some aspects, coordinating the execution of the one or more operations comprises selecting a set of network entities from the one or more network entities to execute the one or more operations based on an availability of computing resources at each of the one or more network entities for executing background operations.

In some aspects, coordinating the execution of the one or more operations comprises selecting a set of network entities from the one or more network entities to execute the one or more operations based on proportional fair scheduling across the one or more network entities.

In some aspects, coordinating the execution of the one or more operations comprises transmitting, from the entity to the user equipment via downlink control information (DCI) signaling, instructions to execute an inference operation using the first sub-model.

In some aspects, coordinating the execution of the one or more operations comprises transmitting, from the entity to the user equipment via signaling carried on a dedicated control channel (DCCH), instructions to execute an inference operation using the first sub-model.

At block 430, the operations 400 proceed with generating a result responsive to the input prompt based on the one or more operations.

In some aspects, the generated result comprises parameters of an instance of the machine learning model to be deployed across one or more devices in at least one of the wireless communications network or another wireless communication network.

In some aspects, outputting the generated result comprises transmitting, via downlink control information (DCI) signaling, the generated result from the entity for receipt by the user equipment.

In some aspects, outputting the generated result comprises transmitting the generated result from the entity to the user equipment via a dedicated control channel (DCCH).

At block 440, the operations 400 proceed with outputting the generated result.

In some aspects, the plurality of sub-models comprise versions of the machine learning model having differing sizes. Generally, sub-models with smaller sizes may be configured for deployment on network entities having fewer available computational resources than network entities for which sub-models with larger sizes are configured for deployment.

In some aspects, the one or more network entities comprise one or more of a radio unit (RU), a distributed unit (DU), or a centralized unit (CU) in a distributed radio access network. The control signaling generally includes at least one of signaling transmitted on an E1 interface between different CUs in the distributed radio access network or signaling transmitted on an F1 interface between the one or more of the RU, the DU, or the CU in the distributed radio access network.

In some aspects, the entity comprises a radio unit (RU) in a distributed radio access network. In such a case, control signaling transmitted to a UE may include DCI signaling, signaling carried on a DCCH, or other signaling on a downlink control channel between the RU and a UE. Control signaling transmitted to other network entities may include signaling carried on one or more of a fronthaul interface, a midhaul interface, or a backhaul interface.

In some aspects, the entity comprises an access point in a radio access network.

In some aspects, the operations 400 may further include receiving a set of speculatively decoded tokens generated by the first sub-model. Coordinating the execution of the one or more operations generally includes coordinating verification of the set of speculatively decoded tokens using the set of sub-models, wherein the set of second sub-models comprises one or more generative artificial intelligence models.

In some aspects, the first sub-model configured to execute on the user equipment comprises a student model, and wherein the one or more second sub-models configured to execute on the one or more network entities comprise teacher models whose outputs are usable by the student model to refine the student model. In some aspects, the operations 400 may further include initiating retraining of the student model based on a difference between an output generated by the student model and the generated result.

Figure 5:
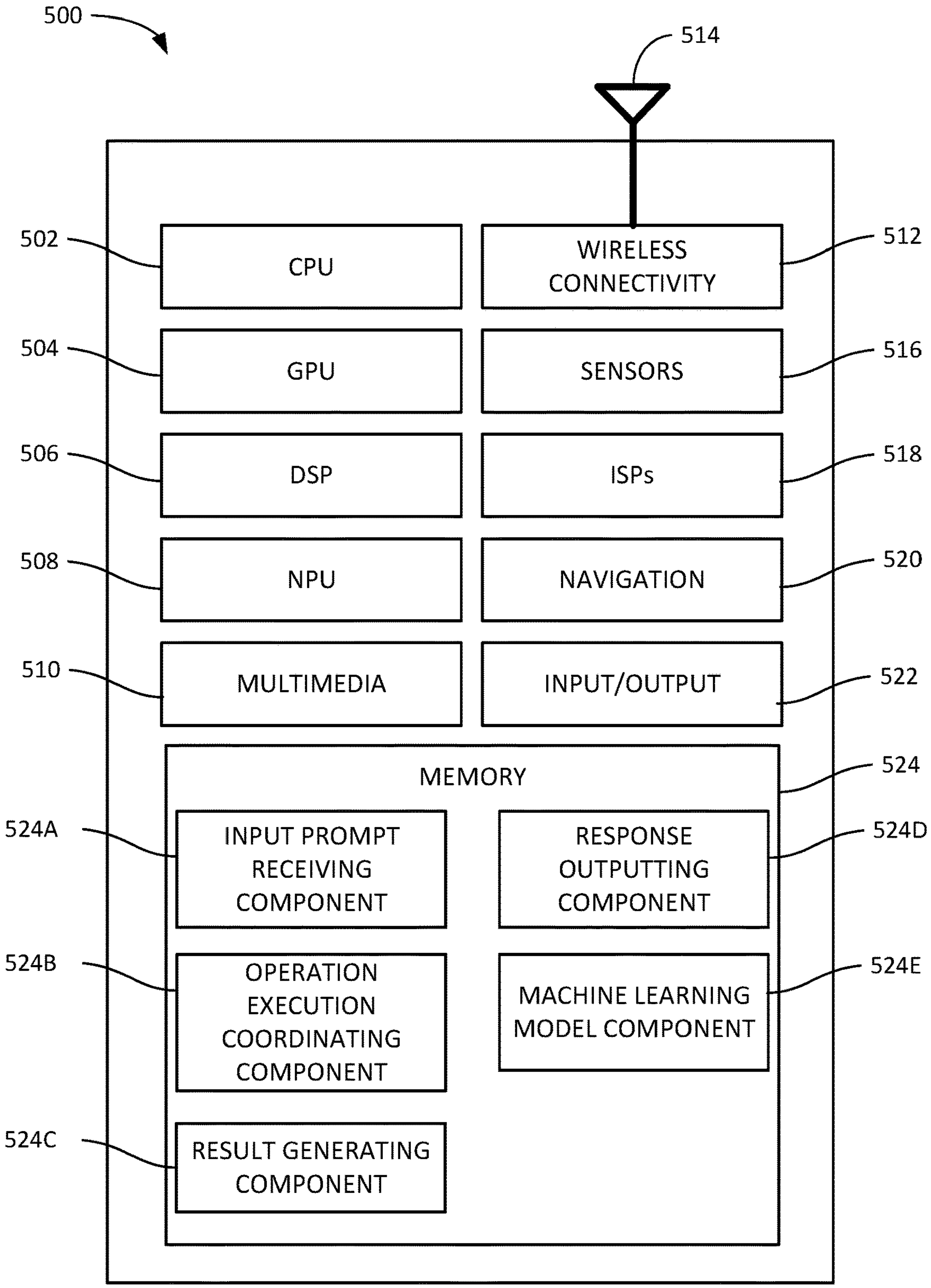
FIG. 5 depicts an example processing system configured to perform various aspects of the present disclosure.

Example Processing Systems for Coordinating Execution of Machine Learning Model Operations Across Entities in a Wireless Communications Network FIG. 5 depicts an example processing system 500 for coordinating the execution of machine learning model operations across entities in a wireless communications network, such as described herein for example with respect to FIGS. 3A, 3B, and 4.

The processing system 500 includes a central processing unit (CPU) 502, which in some examples may be a multi-core CPU. Instructions executed at the CPU 502 may be loaded, for example, from a program memory associated with the CPU 502 or may be loaded from a memory partition (e.g., of a memory 524).

The processing system 500 also includes additional processing components tailored to specific functions, such as a graphics processing unit (GPU) 504, a digital signal processor (DSP) 506, a neural processing unit (NPU) 508, and a connectivity component 512.

An NPU, such as the NPU 508, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as the NPU 508, are configured to accelerate the performance of common machine learning tasks, such as image classification, machine translation, object detection, and various other predictive models. In some examples, a plurality of NPUs may be instantiated on a single chip, such as a system on a chip (SoC), while in other examples such NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this new piece through an already trained model to generate a model output (e.g., an inference).

In some implementations, the NPU 508 is a part of one or more of the CPU 502, the GPU 504, and/or the DSP 506. These may be located on a user equipment (UE) in a wireless communication system or another computing device.

In some examples, the connectivity component 512 may include subcomponents, for example, for third generation (3G) connectivity, fourth generation (4G) connectivity (e.g., Long-Term Evolution (LTE)), fifth generation (5G) connectivity (e.g., New Radio (NR)), Wi-Fi connectivity, Bluetooth connectivity, and other wireless data transmission standards. The connectivity component 512 may be further coupled to one or more antennas 514.

The processing system 500 may also include one or more sensor processing units 516 associated with any manner of sensor, one or more image signal processors (ISPs) 518 associated with any manner of image sensor, and/or a navigation processor 520, which may include satellite-based positioning system components (e.g., GPS or GLONASS) as well as inertial positioning system components.

The processing system 500 may also include one or more input and/or output devices 522, such as screens, touch-sensitive surfaces (including touch-sensitive displays), physical buttons, speakers, microphones, and the like In some examples, one or more of the processors of the processing system 500 may be based on an ARM or RISC-V instruction set.

The processing system 500 also includes a memory 524, which is representative of one or more static and/or dynamic memories, such as a dynamic random access memory, a flash-based static memory, and the like. In this example, the memory 524 includes computer-executable components, which may be executed by one or more of the aforementioned processors of the processing system 500.

In particular, in this example, the memory 524 includes an input prompt receiving component 524A, an operation execution coordinating component 524B, a result generating component 524C, a response outputting component 524D, and a machine learning model component 524E. The depicted components, and others not depicted, may be configured to perform various aspects of the methods described herein.

Generally, the processing system 500 and/or components thereof may be configured to perform the methods described herein.

Example Clauses

Implementation details of various aspects of the present disclosure are described in the following numbered clauses:

Clause 1: A processor-implemented method by an entity in a wireless communications network, comprising: receiving, at the entity, an input prompt for processing using a machine learning model including a plurality of sub-models, the plurality of sub-models including a first sub-model configured to execute on a user equipment and one or more second sub-models configured to execute on one or more network entities, including the entity, in the wireless communications network; coordinating, via transmission of control signaling by the entity to one or more of the user equipment or network entities in the wireless communications network, execution of one or more operations for the machine learning model using a set of sub-models from the plurality of sub-models, the one or more operations being based on the input prompt; generating a result responsive to the input prompt based on the one or more operations; and outputting the generated result.

Clause 2: The method of Clause 1, wherein coordinating the execution of the one or more operations comprises: generating an inference based on one of the second sub-models, the one of the second sub-models comprising a model executing on the entity; determining that the generated inference meets a threshold expected accuracy level; and transmitting, to the one or more network entities, one or more control signals instructing sub-models configured to execute on the one or more network entities to terminate operations for the received input prompt.

Clause 3: The method of Clause 1 or 2, wherein outputting the generated result comprises transmitting, via downlink control information (DCI) signaling, the generated result from the entity for receipt by the user equipment.

Clause 4: The method of any of Clauses 1 through 3, wherein outputting the generated result comprises transmitting the generated result from the entity to the user equipment via a dedicated control channel (DCCH).

Clause 5: The method of any of Clauses 1 through 4, wherein the plurality of sub-models comprise versions of the machine learning model having differing sizes, and wherein sub-models with smaller sizes are configured for deployment on network entities having fewer available computational resources than network entities for which sub-models with larger sizes are configured for deployment.

Clause 6: The method of any of Clauses 1 through 5, wherein: the one or more network entities comprise one or more of a radio unit (RU), a distributed unit (DU), or a centralized unit (CU) in a distributed radio access network; and the control signaling comprises at least one of signaling transmitted on an E1 interface between different CUs in the distributed radio access network or signaling transmitted on an F1 interface between the one or more of the RU, the DU, or the CU in the distributed radio access network.

Clause 7: The method of any of Clauses 1 through 6, wherein the entity comprises a radio unit (RU) in a distributed radio access network.

Clause 8: The method of any of Clauses 1 through 7, wherein the entity comprises an access point in a radio access network.

Clause 9: The method of any of Clauses 1 through 8, further comprising receiving a set of speculatively decoded tokens generated by the first sub-model, wherein coordinating the execution of the one or more operations comprises coordinating verification of the set of speculatively decoded tokens using the set of sub-models, wherein the set of second sub-models comprises one or more generative artificial intelligence models.

Clause 10: The method of any of Clauses 1 through 9, wherein the first sub-model configured to execute on the user equipment comprises a student model, and wherein the one or more second sub-models configured to execute on the one or more network entities comprise teacher models whose outputs are usable by the student model to refine the student model.

Clause 11: The method of Clause 10, further comprising initiating retraining of the student model based on a difference between an output generated by the student model and the generated result.

Clause 12: The method of any of Clauses 1 through 11, wherein coordinating the execution of the one or more operations comprises selecting a set of network entities from the one or more network entities to execute the one or more operations based on an availability of computing resources at each of the one or more network entities for executing background operations.

Clause 13: The method of any of Clauses 1 through 12, wherein coordinating the execution of the one or more operations comprises selecting a set of network entities from the one or more network entities to execute the one or more operations based on proportional fair scheduling across the one or more network entities.

Clause 14: The method of any of Clauses 1 through 13, wherein coordinating the execution of the one or more operations comprises transmitting, from the entity to the user equipment via downlink control information (DCI) signaling, instructions to execute an inference operation using the first sub-model.

Clause 15: The method of any of Clauses 1 through 14, wherein coordinating the execution of the one or more operations comprises transmitting, from the entity to the user equipment via signaling carried on a dedicated control channel (DCCH), instructions to execute an inference operation using the first sub-model.

Clause 16: The method of any of Clauses 1 through 15, wherein the generated result comprises parameters of an instance of the machine learning model to be deployed across one or more devices in at least one of the wireless communications network or another wireless communication network.

Clause 17: A processing system, comprising: at least one memory having executable instructions stored thereon; and one or more processors configured to execute the executable instructions in order to cause the processing system to perform the operations of any of Clauses 1 through 16.

Clause 18: A processing system, comprising means for performing the operations of any of Clauses 1 through 16.

Clause 19: A non-transitory computer-readable medium having instructions stored thereon which, when executed by one or more processors, perform the operations of any of Clauses 1 through 16.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word “exemplary” means “serving as an example, instance, or illustration.” Any aspect described herein as “exemplary” is not necessarily to be construed as preferred or advantageous over other aspects.

As used herein, a phrase referring to “at least one of” a list of items refers to any combination of those items, including single members. As an example, “at least one of: a, b, or c” is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term “determining” encompasses a wide variety of actions. For example, “determining” may include calculating, computing, processing, deriving, investigating, looking up (e.g., looking up in a table, a database or another data structure), ascertaining, and the like. Also, “determining” may include receiving (e.g., receiving information), accessing (e.g., accessing data in a memory), and the like. Also, “determining” may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An entity for wireless communications, comprising:

at least one memory having executable instructions stored thereon; and one or more processors configured to execute the executable instructions to cause the entity to:

receive, at the entity, an input prompt for processing using a machine learning model including a plurality of sub-models, the plurality of sub-models including a first sub-model configured to execute on a user equipment and one or more second sub-models configured to execute on one or more network entities, including the entity, in a wireless communications network;

coordinate, via transmission of control signaling by the entity to one or more of the user equipment or network entities in the wireless communications network, execution of one or more operations for the machine learning model using a set of sub-models from the plurality of sub-models, the one or more operations being based on the input prompt;

generate a result responsive to the input prompt based on the one or more operations; and output the generated result.

2. The entity of claim 1, wherein to coordinate the execution of the one or more operations, the one or more processors are configured to cause the entity to:

generate an inference based on one of the second sub-models, the one of the second sub-models comprising a model executing on the entity;

determine that the generated inference meets a threshold expected accuracy level; and transmit, to the one or more network entities, one or more control signals instructing sub-models configured to execute on the one or more network entities to terminate operations for the received input prompt.

3. The entity of claim 1, wherein:

to output the generated result, the one or more processors are configured to cause the entity to transmit, via downlink control information (DCI) signaling, the generated result from the entity for receipt by the user equipment, or to coordinate the execution of the one or more operations, the one or more processors are configured to cause the entity to transmit, from the entity to the user equipment via DCI signaling, instructions to execute an inference operation using the first sub-model.

4. The entity of claim 1, wherein:

to output the generated result, the one or more processors are configured to cause the entity to transmit the generated result from the entity to the user equipment via a dedicated control channel (DCCH), or to coordinate the execution of the one or more operations, the one or more processors are configured to cause the entity to transmit, from the entity to the user equipment via signaling carried on the DCCH, instructions to execute an inference operation using the first sub-model.

5. The entity of claim 1, wherein the plurality of sub-models comprise versions of the machine learning model having differing sizes, and wherein sub-models with smaller sizes are configured for deployment on network entities having fewer available computational resources than network entities for which sub-models with larger sizes are configured for deployment.

6. The entity of claim 1, wherein:

the one or more network entities comprise one or more of a radio unit (RU), a distributed unit (DU), or a centralized unit (CU) in a distributed radio access network; and the control signaling comprises at least one of signaling transmitted on an E1 interface between different CUs in the distributed radio access network or signaling transmitted on an F1 interface between the one or more of the RU, the DU, or the CU in the distributed radio access network.

7. The entity of claim 1, wherein the entity comprises a radio unit (RU) in a distributed radio access network.

8. The entity of claim 1, wherein the entity comprises an access point in a radio access network.

9. The entity of claim 1, wherein to coordinate the execution of the one or more operations, the one or more processors are configured to cause the entity to select a set of network entities from the one or more network entities to execute the one or more operations based on an availability of computing resources at each of the one or more network entities for executing background operations.

10. The entity of claim 1, wherein to coordinate the execution of the one or more operations, the one or more processors are configured to cause the entity to select a set of network entities from the one or more network entities to execute the one or more operations based on proportional fair scheduling across the one or more network entities.

11. The entity of claim 1, wherein the generated result comprises parameters of an instance of the machine learning model to be deployed across one or more devices in at least one of the wireless communications network or another wireless communication network.

12. A processor-implemented method by an entity in a wireless communications network, comprising:

receiving, at the entity, an input prompt for processing using a machine learning model including a plurality of sub-models, the plurality of sub-models including a first sub-model configured to execute on a user equipment and one or more second sub-models configured to execute on one or more network entities, including the entity, in the wireless communications network;

coordinating, via transmission of control signaling by the entity to one or more of the user equipment or network entities in the wireless communications network, execution of one or more operations for the machine learning model using a set of sub-models from the plurality of sub-models, the one or more operations being based on the input prompt;

generating a result responsive to the input prompt based on the one or more operations; and outputting the generated result.

13. The method of claim 12, wherein coordinating the execution of the one or more operations comprises:

generating an inference based on one of the second sub-models, the one of the second sub-models comprising a model executing on the entity;

determining that the generated inference meets a threshold expected accuracy level; and transmitting, to the one or more network entities, one or more control signals instructing sub-models configured to execute on the one or more network entities to terminate operations for the received input prompt.

14. The method of claim 12, wherein outputting the generated result comprises transmitting, via one or more of downlink control information (DCI) signaling or signaling carried on a dedicated control channel (DCCH), the generated result from the entity for receipt by the user equipment.

15. The method of claim 12, wherein the plurality of sub-models comprise versions of the machine learning model having differing sizes, and wherein sub-models with smaller sizes are configured for deployment on network entities having fewer available computational resources than network entities for which sub-models with larger sizes are configured for deployment.

16. The method of claim 12, wherein:

the one or more network entities comprise one or more of a radio unit (RU), a distributed unit (DU), or a centralized unit (CU) in a distributed radio access network; and the control signaling comprises at least one of signaling transmitted on an E1 interface between different CUs in the distributed radio access network or signaling transmitted on an F1 interface between the one or more of the RU, the DU, or the CU in the distributed radio access network.

17. The method of claim 12, further comprising receiving a set of speculatively decoded tokens generated by the first sub-model, wherein coordinating the execution of the one or more operations comprises coordinating verification of the set of speculatively decoded tokens using the set of sub-models, wherein the set of second sub-models comprises one or more generative artificial intelligence models.

18. The method of claim 12, wherein the first sub-model configured to execute on the user equipment comprises a student model, and wherein the one or more second sub-models configured to execute on the one or more network entities comprise teacher models whose outputs are usable by the student model to refine the student model.

19. The method of claim 12, wherein coordinating the execution of the one or more operations comprises selecting a set of network entities from the one or more network entities to execute the one or more operations based on one or more of an availability of computing resources at each of the one or more network entities for executing background operations or proportional fair scheduling across the one or more network entities.

20. The method of claim 12, wherein coordinating the execution of the one or more operations comprises transmitting, from the entity to the user equipment via one or more of downlink control information (DCI) signaling or signaling carried on a dedicated control channel (DCCH), instructions to execute an inference operation using the first sub-model.

* * * * *